United States Patent

Ávár et al.

Patent Number: 4,485,034
Date of Patent: Nov. 27, 1984

[54] AROMATIC OXAMIDES USEFUL AS STABILIZERS

[75] Inventors: Lajos Ávár, Biel-Benken, Switzerland; Evelyne Kalt, Riedisheim, France; Hellmuth Reinshagen, Heitersheim, Fed. Rep. of Germany

[73] Assignee: Sandoz Ltd., Basel, Switzerland

[21] Appl. No.: 529,386

[22] Filed: Sep. 6, 1983

Related U.S. Application Data

[62] Division of Ser. No. 302,036, Sep. 14, 1981, Pat. No. 4,412,024.

[30] Foreign Application Priority Data

Sep. 20, 1980 [DE] Fed. Rep. of Germany ....... 3035638

[51] Int. Cl.³ .................... C07C 103/38; C09D 7/12; C08K 5/20
[52] U.S. Cl. ................. 252/403; 428/416; 428/425.8; 428/457; 428/458; 428/460; 428/461; 523/508; 524/222; 524/223; 524/254; 524/721; 524/728; 524/906
[58] Field of Search .............. 524/220, 222, 223, 254, 524/721, 728, 906; 252/402, 403, 391, 392; 428/416, 425.8, 457, 458; 523/508; 564/154, 158

[56] References Cited

U.S. PATENT DOCUMENTS

| 3,529,982 | 9/1970 | Luethi et al. .......... 106/178 |
| 3,627,831 | 12/1971 | Huber-Emden et al. ....... 260/562 P |
| 3,676,494 | 7/1972 | Biland et al. .......... 524/220 |
| 3,808,273 | 4/1974 | Burdet et al. .......... 524/220 |
| 3,906,033 | 9/1975 | Biland et al. .......... 524/220 |
| 3,906,041 | 9/1975 | Hofer et al. .......... 524/220 |
| 4,003,875 | 1/1977 | Luthi et al. .......... 106/178 |
| 4,238,351 | 12/1980 | Alfes et al. .......... 424/59 |
| 4,412,024 | 10/1983 | Ávár et al. .......... 524/220 |

FOREIGN PATENT DOCUMENTS 2000512 1/1979 United Kingdom ............ 524/220

Primary Examiner—Herbert J. Lilling
Attorney, Agent, or Firm—Gerald D. Sharkin; Richard E. Vila; Thomas C. Doyle

[57] ABSTRACT

Oxalanilides of formula I

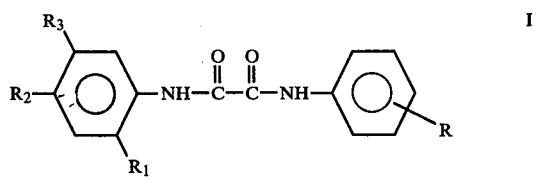

in which
R is $C_{6-22}$ alkyl or $C_{6-22}$ alkoxy
$R_1$ and $R_2$ are independently, hydrogen, $C_{1-8}$ alkyl, $C_{1-12}$ alkoxy, $C_{1-12}$ alkylthio, phenoxy or phenylthio; provided that $R_1$ and $R_2$ may not both be selected from alkylthio, phenoxy and phenylthio;
and $R_3$ is hydrogen or $C_{1-8}$ alkyl certain of which are novel, are useful as UV-stabilizers in organic polymers and organic polymer-containing coatings, particularly automotive finishes. The compounds have low volatility and excellent solubility in organic solvents such as are used in liquid finishes.

15 Claims, No Drawings

AROMATIC OXAMIDES USEFUL AS STABILIZERS

This is a division of application Ser. No. 302,036, filed Sept. 14, 1981, now U.S. Pat. No. 4,412,024.

This invention relates to the UV-stabilization of organic polymers and organic polymer-containing coatings, particularly automotive finishes.

Automotive finishes are generally solutions or dispersions of organic polymers or polymer precursors in organic solvents. The majority are stoving finishes, which require the application of heat, generally above 100° C., in order to harden the finish in an acceptable time once it has been applied to the primer-coated metal surface. The effect of this heating may be to accelerate the chemical reaction between polymer precursors in a thermosetting system, or to bring about fusion of particles of a thermoplastic polymer.

Many automotive finishes are metallic finishes, which contain flakes of metal, usually aluminium, in order to provide optical effects due to reflection. Such finishes are often two-coat finishes, in which a clear top coat is applied over a base coat containing the pigment and metal flakes. Such two-coat metallic finishes have particular need of UV stabilizers in the top coat, since the polymer in this coat is not protected by light-absorbing pigments, and it is subjected to almost double the normal amount of radiation because of reflection of light from the lower metallic layer.

It is known from British Patent application No. 2 000 512 to use aromatic oxamides as UV-stabilizers in finishes, particularly automotive finishes and in organic polymers generally, but those used up to now have the disadvantage that they have low solubilities in organic solvents such as are used in automotive finishes. This leads to difficulties in the compounding of finishes containing such stabilizers, and limits their effectiveness. The compounds are also somewhat volatile and a significant quantity is lost on stoving under conventional conditions, such as 140° C. for 30 minutes.

It has now been found that a certain group of aromatic oxamides have a very high solubility in organic solvents, particularly hydrocarbon solvents, and also have markedly low volatility and good UV-stabilizing properties.

Accordingly, the present invention provides a solid or liquid concentrate comprising a solution of at least 30% by weight of a compound of formula I

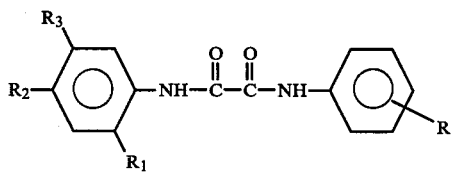

in which
is $C_{6-22}$ alkyl or $C_{6-22}$ alkoxy
$R_1$ and $R_2$ are independently, hydrogen, $C_{1-8}$ alkyl, $C_{1-12}$alkoxy, $C_{1-12}$alkylthio, phenoxy or phenylthio; provided that $R_1$ and $R_2$ may not both be selected from alkylthio, phenoxy and phenylthio;
and $R_3$ is hydrogen or $C_{1-8}$ alkyl
in a solid or liquid organic solvent.

R is preferably located in the 4'-position and when alkoxy is preferably $C_{10-14}$ alkoxy, which is preferably a mixture of isomeric alkoxy groups.

Preferably, however, R is an alkyl group which may be linear or branched or, preferably, a mixture of isomeric alkyl groups. R is preferably $C_{8-18}$ alkyl, more preferably $C_{10-14}$ alkyl, particularly dodecyl. Particularly preferred is a mixture of isomeric dodecyl groups.

$R_1$ and $R_2$ as alkyl are preferably methyl or ethyl, as alkoxy are preferably $C_{1-8}$ alkoxy, more preferably methoxy or ethoxy, particularly ethoxy, and as alkylthio are preferably $C_{1-8}$ alkylthio, more preferably methylthio.

Preferably at least one of $R_1$ and $R_2$ is other than hydrogen or alkyl. More preferably $R_1$ is alkoxy and $R_2$ is hydrogen or alkoxy, particularly hydrogen.

$R_3$ as alkyl is preferably $C_{1-4}$ alkyl, more preferably methyl or butyl; more preferably, however, $R_3$ is hydrogen.

Compounds of formula Ia

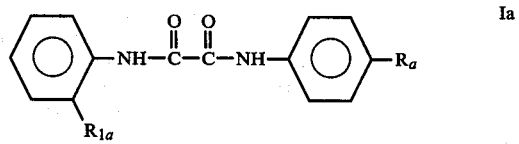

in which
$R_a$ is $C_{8-18}$ (alkyl)
and $R_{1a}$ is methoxy or ethoxy
are new and constitute part of the present invention. Preferred compounds of formula Ia are those in which, independently, $R_a$ is $C_{10-14}$ alkyl, preferably dodecyl and $R_{1a}$ is ethoxy. Particularly preferred is 2-ethoxy-4'-iso-dodecyloxalanilide, in which the isododecyl group comprises a mixture of isomeric dodecyl groups.

Compounds of formula Ia may be prepared by the reaction of 1 mole of oxalic acid or a functional derivative thereof with, in any order, 1 mole of a compound of formula II

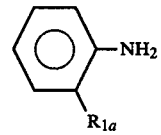

and 1 mole of a compound of formula III

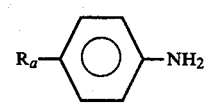

in which $R_a$ and $R_{1a}$ are as defined above. The compounds of formulae II and III are known, and the reaction conditions are conventional. Compounds of formula I other than those of formula Ia are known or may be obtained in analogous manner.

In the solid or liquid concentrates of the invention, the concentration of compound of formula I is at least 30% and preferably 50% by weight, these percentages being based on the total weight of the concentrate. For the solid concentrates, the solid solvent may be an organic polymer, for example a polyolefin, or may be an organic solvent which is solid at room temperature but which melts on warming. Solid solutions in polymers may be used as master-batch compositions, solid solution of the other type are melted and then used in the same way as the liquid solutions.

Preferably, however, the solvent is a liquid at room temperature, for example a hydrocarbon solvent, which may be aromatic e.g. benzene, toluene, or xylene or aliphatic, e.g. hexane, octane, petroleum fractions, etc. Other suitable solvents include alcohols, ethers, ketones and esters, e.g. methyl ethyl ketone and ethyl acetate, and water-soluble organic solvents such as liquid polyalkylene oxides and their ethers, e.g. diethylene glycol methyl ether. The liquid solvent may also be a liquid finish system comprising polymer and/or polymer precursors together with an organic solvent.

Preferred solvents are hydrocarbons, particularly xylene, in which compounds of formula I have solubilities of up to 80% at room temperature, and do not crystallise out even at low temperatures. Concentrates of compounds of formula I in xylene are compatible with almost all automotive finishes, whereas concentrates in water-soluble solvents such as the glycol ethers are compatible with water-based emulsion paints.

The compounds of formula I are suitable for use as UV stabilizers in a wide range of liquid finishes, for example those based on combinations of melamine-formaldehyde resins with oil-modified polyester resins, polyacrylate resins with added crosslinkers, or saturated polyesters; or on self-crosslinked polyacrylate or polyacrylate resin copolymerised with styrene.

Further examples are two-component finishes based on an aliphatic or aromatic di-isocyanate and a hydroxy-group-containing polyacrylate, polyester or polyether resin. Thermoplastic polyacrylate resins may also be used, the latter being particularly useful in metallic finishes, as are also polyacrylate resins with added crosslinkers in combination with melamine-formaldehyde resins etherified with butanol and, further, hydroxy-group-containing polyacrylate resins hardened with aliphatic diisocyanates. p By the use of liquid concentrates of compounds of formula I according to the invention, the UV stabilizers of formula I may be rapidly and accurately metered into the liquid finish. This is highly advantageous compared to the difficult addition of a poorly-soluble oxamide stabilizer in solid form. The compounds of formula I may also be added in solid form to liquid finishes, in which they will dissolve rapidly. The invention also provides a finish, whether in liquid form before application or in the cured form after application to a substrate, containing a compound of formula I, preferably a compound of formula Ia. The concentration of compound of formula I in the finish is preferably from 0.02 to 5% by weight, more preferably from 0.2 to 2%. The finish is preferably a stoving automotive finish, more preferably the top coat of a stoving two layer metallic automotive finish.

The following examples, in which all parts are be weight and all temperatures are in °C., illustrate the invention.

EXAMPLE 1

(a) 730 g diethyl oxalate and 274 g o-phenetedin were stirred for 3 hours on a heating bath at 150°, during which time 88 ml ethanol distilled off. Excess diethyl oxalate was then removed by distillation at 170°/15 mm Hg. The crude product (466 g) was dissolved in 466 ml methanol, the solution cooled to 0°–95° and the white crystals filtered and dried, to give 428 g of the compound of formula:

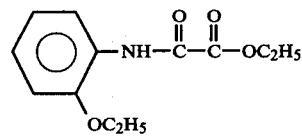

(b) The product of Example 1 (a) (188.6 g), 130.7 g freshly distilled p-iso-dodecylaniline and 4.0 g boric acid, were stirred together for 2 hours at 160°, ethanol being removed by distillation. The reaction product was then treated with a further 2.0 g of boric acid and heated for a further hour at 160° under water pump vacuum (30 mm Hg).

The brown reaction product was treated at 95° first with 250 ml toluene then 50 ml 5% hydrochloric acid and stirred for 30 minutes at 90°–95°. The aqueous phase was separated and the toluene phase washed with 100 ml water then dried by azeotropic distillation, stirred for 15 minutes at 80° with 22 g fuller's earth and filtered.

Evaporation of the toluene gives 220 g of 2-ethyoxy-4'-iso-dodecyloxalanilide of formula

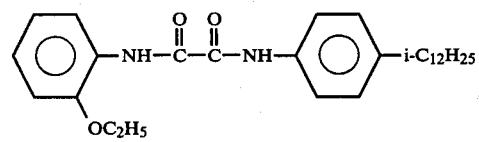

as a resinous solid.

The product has a solubility of >70% by weight at 20° C. in toluene, xylene, ethyl acetate, hexane and in a conventional clear finish prepared according to Example (3b) below.

EXAMPLE 2

By repeating the procedure of Example 1 using p-n-dodecylaniline in place of p-iso-dodecylaniline, 2-ethoxy-4'-n-dodecyloxalanilide, m.p. 84°–86° is obtained.

EXAMPLE 3

A two-layer metallic automotive finish consisting of a base coat and a clear top coat, had the following composition:

(a) base coat 12.6 parts commercial polyacrylate resin, with added cross-linking as defined in DIN 53 186 (Viacryl SC 344, Vianova, Vienna, supplied as 50% solution in xylene/butanol 4:1)

2.19 parts commercial butanol-etherified melamine resin, medium reactive, prepared by condensation of 1 mol melamine with 3–6 mole formaldehyde, etherified with 3–6 mole butanol according to DIN 53 187 (Maprenal MF 800, Casella, supplied as 72% solution in isobutanol)

0.96 parts butanol 0.26 parts colloidal silicic acid 7.05 parts xylene 52.0 parts of a 20% cellulose acetate butyrate solution of the following composition by weight:

20% cellulose acetate butyrate: acetyl content 13.6%, butyryl content 38.7%, hydroxyl content 1.25%, viscosity of 20% solution in acetone=200 cp
10% butanol
35% xylene
35% butyl acetate
6. 80 parts non-leafing aluminium paste, supplied as 65% suspension in alkylglycol acetate according to DIN 55 923
18.14 parts butyl acetate
0.3 parts copper phthalocyanine blue (C.I. Pigment Blue 15:1)
(b) top coat
80.00 parts polyacrylate resin (as in the base coat)
13.75 parts melamine resin (as in the base coat)
4.50 parts butyl glycollate
7.50 parts aromatic hydrocarbon solvent, b.p. 186°–212°
6.00 parts aromatic hydrocarbon solvent, b.p. 155°–178°
(c) application The base coat was applied to primer-coated metal plates by spraying, giving a layer approx. 20 μm thick, without UV stabilizer. After drying of the base coat, the plates were sprayed with (i) top coat as in (b) above, without UV stabilizer or
(ii) top coat as in (b) above, containing 1 part
(i.e. 1% by wt.) of the compound of Example 1b, added as an 80% solution in xylene,
and stoved at 140° for 30 minutes. Exposure tests showed good results for the plates coated with topcoat ii).

EXAMPLE 4–7

UV-stabilized 2-coat metallic finishes may be prepared as described in Example 3, by using in place of the compound of Example 1(b), the compounds shown in the following Table. These compounds may be prepared by the method of Example 1.

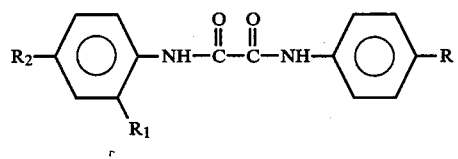

| Example No. | R | $R_1$ | $R_2$ | m.p. °C. |
|---|---|---|---|---|
| 4 | n-$C_{12}H_{25}$ | H | H | 166–168 |
| 5 | i-$C_{12}H_{25}$ | H | H | 65–70 |
| 6 | n-$C_{12}H_{25}$ | —$OC_2H_5$ | H | 84–86 (compound of Example 2) |
| 7 | i-$C_{12}H_{25}$ | H | i-$C_{12}H_{25}$ | oil |

What is claimed is:

1. A mixture of compounds of formula Ia

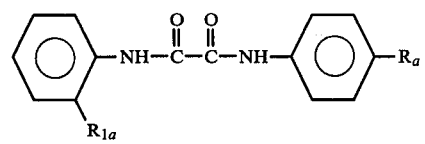

in which
$R_a$ is $C_{8-18}$ alkyl
and $R_{1a}$ is methoxy or ethoxy,
said compounds having differing isomers of $R_a$.

2. A mixture according to claim 1 wherein $R_a$ is $C_{10-14}$ alkyl.

3. A mixture according to claim 1 wherein $R_a$ is dodecyl.

4. A mixture according to claim 1 wherein $R_{1a}$ is ethoxy.

5. A mixture according to claim 2 wherein $R_{1a}$ is ethoxy.

6. A mixture according to claim 3 wherein $R_{1a}$ is ethoxy.

7. A mixture according to claim 1 which is soluble in an organic solvent to the extent of at least 30% by weight, based on the total weight of the dissolved mixtue and the organic solvent.

8. A mixture according to claim 2 which is soluble in an organic solvent to the extent of at least 30% by weight, based on the total weight of the dissolved mixture and the organic solvent.

9. A mixture according to claim 7 which is soluble in an organic solvent to the extent of at least 50% by weight, based on the total weight of the dissolved mixture and the organic solvent.

10. A mixture according to claim 7 wherein the organic solvent is selected from the group consisting of benzene, toluene, xylene, hexane, octane, methyl ethyl ketone, ethyl acetate and diethylene glycol methyl ether.

11. A mixtue according to claim 9 wherein the organic solvent is selected from the group consisting of benzene, toluene, xylene, hexane, octane, methyl ethyl ketone, ethyl acetate and diethylene glycol methyl ether.

12. A mixture according to claim 8 wherein the organic solvent is xylene.

13. A mixture according to claim 10 wherein the organic solvent is xylene.

14. Mixture according to claim 11 wherein the organic solvent is xylene.

15. A mixture according to claim 14 wherein $R_a$ is dodecyl and $R_{1a}$ is ethoxy.

* * * * *